United States Patent
Kamijo et al.

(10) Patent No.: US 7,146,801 B2
(45) Date of Patent: Dec. 12, 2006

(54) FUEL VAPORIZING DEVICE

(75) Inventors: Motohisa Kamijo, Kamakura (JP); Takashi Aoyama, Yokohama (JP); Takao Izumi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/541,382

(22) PCT Filed: Dec. 10, 2003

(86) PCT No.: PCT/JP03/15788

§ 371 (c)(1),
(2), (4) Date: Jul. 1, 2005

(87) PCT Pub. No.: WO2004/062788

PCT Pub. Date: Jul. 29, 2004

(65) Prior Publication Data

US 2006/0037308 A1 Feb. 23, 2006

(30) Foreign Application Priority Data

Jan. 9, 2003 (JP) ............................. 2003-003594

(51) Int. Cl.
*F01N 3/00* (2006.01)

(52) U.S. Cl. .................. 60/286; 60/289; 60/293; 60/295; 60/303; 48/76; 48/127.7; 48/127.9; 48/198.7; 48/198.8; 48/199 FM; 48/197 R; 429/12; 429/20; 429/22; 429/24

(58) Field of Classification Search ............... 60/286, 60/289, 292, 293, 300, 303, 295, 297; 48/76, 48/127.1, 127.3, 127.7, 127.9, 198.7, 199 FM, 48/198.8, 197 R; 429/12, 17, 20, 22, 24

See application file for complete search history.

(56) References Cited

U.S. PATENT DOCUMENTS

| | | | | |
|---|---|---|---|---|
| 6,699,609 | B1 * | 3/2004 | Kotani et al. | 429/19 |
| 6,887,603 | B1 * | 5/2005 | Kasahara et al. | 429/17 |
| 6,905,327 | B1 * | 6/2005 | Tachihara et al. | 431/5 |
| 6,955,860 | B1 * | 10/2005 | Matoba | 429/20 |
| 6,991,663 | B1 * | 1/2006 | Abe | 48/76 |
| 2001/0032468 | A1 | 10/2001 | Okusawa et al. | |
| 2002/0071975 | A1 | 6/2002 | Shimazu | |
| 2003/0019638 | A1 | 1/2003 | Simpson | |

(Continued)

FOREIGN PATENT DOCUMENTS

DE 197 17 544 A1 10/1998

(Continued)

*Primary Examiner*—Binh Q. Tran
(74) *Attorney, Agent, or Firm*—Foley & Lardner LLP

(57) ABSTRACT

Hydrogen-rich reformate gas is produced by a fuel reformer (2) from fuel vapor containing hydrocarbon, which is produced by a fuel vaporizer (6), by means of a partial oxidation reaction and a steam reforming reaction. A fuel injector (8, 9) supplies fuel to the fuel vaporizer (6), and an air injector (8a) supplies air to the fuel vaporizer (6). A glow plug (13) partially oxidizes the air-fuel mixture inside the fuel vaporizer (6). By controlling the air supply amount in relation to the fuel supply amount to obtain an excess air factor corresponding to a predetermined rich air-fuel ratio, a part of the air-fuel mixture in the fuel vaporizer (6) is partially oxidized, and the remaining fuel vapor is heated by the oxidation heat. As a result, the partial oxidation reaction and steam reforming reaction in the fuel reformer (2) are performed with a favorable balance.

11 Claims, 4 Drawing Sheets

U.S. PATENT DOCUMENTS

2003/0093950 A1   5/2003   Goebel et al.

FOREIGN PATENT DOCUMENTS

| JP | 07-103090 A | 4/1995 |
| JP | 07-172802 A | 7/1995 |
| JP | 08-002901 A | 1/1996 |
| JP | 08-188784 A | 7/1996 |
| JP | 08-189380 A | 7/1996 |
| JP | 2000-063104 A | 2/2000 |
| JP | 2001-027403 A | 1/2001 |
| JP | 2001-210347 A | 8/2001 |
| JP | 2001-223016 A | 8/2001 |

* cited by examiner

FUEL VAPORIZING DEVICE

FIELD OF THE INVENTION

This invention relates to the supply of fuel vapor to a fuel reformer which reforms hydrocarbon fuel to extract hydrogen.

BACKGROUND OF THE INVENTION

JP2001-223016A, JP2001-210347A, JP2001-27403A, JP2000-63104A, Tokkai Hei 8-189380, Tokkai Hei 8-188784, Tokkai Hei 8-2901, Tokkai Hei 7-172802, and Tokkai Hei 7-103090, published by the Japan Patent Office, are known in relation to a fuel reforming device which extracts hydrogen from hydrocarbon fuel such as gasoline or methanol in order to operate a fuel cell system.

SUMMARY OF THE INVENTION

To perform a reforming reaction in a reformer, hydrocarbon fuel such as gasoline or methanol and water must be vaporized prior to being supplied to a reforming catalyst. Reforming is performed in the reformer by two types of processes, partial oxidation reforming and steam reforming, as shown in equations (1) and (2).

Partial oxidation reforming: (1)
$$C_8H_{18} + \frac{8}{2}O_2 \rightarrow 8CO + 9H_2 + \Delta Q$$

Steam reforming: 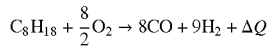$C_8H_{18}+8H_2O \rightarrow 8CO+17H_2-\Delta Q$ (2)

The $+\Delta Q$ in the equation (1) indicates that the partial oxidation reaction is an exothermic reaction. The $-\Delta Q$ in the equation (2) indicates that the steam reforming reaction is an endothermic reaction.

If the equations (1) and (2) are compared, it can be seen that the steam reforming reaction generates approximately 1.9 times more hydrogen ($H_2$) than is generated in the partial oxidation reaction from the same one mole of n-octane ($C_8H_{18}$).

A reforming device disclosed in Tokkai Hei 7-172802 is constituted such that a burner is used to heat the reformer while overheating of the burner is prevented by spraying cooling water. The reason why the burner must be cooled in this manner is that partial oxidation reforming is an exothermic reaction. The thermal insulation limiting temperature when n-octane at the air-fuel ratio of the equation (2) and air containing oxygen cause partial oxidation in an environment of twenty-five degrees centigrade and one atmosphere is 694.2 degrees centigrade. When this temperature is reached, the partial oxidation reaction is already in full operation, but at this stage the steam reforming reaction is barely progressing.

The reaction speeds of the partial oxidation reforming of the equation (1) and the steam reforming of the equation (2) cannot be compared according to the theory of equilibrium, but typically the reaction speed of the partial oxidation reforming reaction is higher than that of the steam reforming reaction. This is self-evident from the fact that partial oxidation is performed in the vapor phase, whereas the steam reforming reaction requires catalytic activation even when high-temperature water vapor is present. Hence in a conventional device such as that disclosed in Tokkai Hei 7-172802, reforming is performed mainly by partial oxidation reforming in the vapor phase by igniting vaporized fuel using the burner to generate a flame of 700 degrees centigrade or higher.

As is clear when the equations (1) and (2) are compared, however, steam reforming produces a larger amount of hydrogen ($H_2$) than partial oxidation reforming, and in that sense has better reforming efficiency. Conversely, the high reforming efficiency of steam reforming is impossible to achieve in partial oxidation reforming. Hence in a conventional device such as that of Tokkai Hei 7-172802, which has a high partial oxidation reforming rate, high reforming efficiency cannot be achieved.

In the case of a self-starting reformer, which performs fuel vaporization and catalyst activation using the reaction heat generated by partial oxidation reforming, upon start-up a part of the fuel that is supplied to the reformer may be discharged as unburned fuel before the catalyst is activated, or a part of the fuel may become adhered to the catalyst, hindering catalyst activation.

It is therefore an object of this invention to improve the reforming efficiency and starting performance of a fuel reforming device.

In order to achieve the above object, this invention provides a fuel vaporizing device which supplies fuel vapor containing hydrocarbon to a fuel reformer which produces reformate gas having hydrogen as a main component from the fuel vapor by means of a catalytic reaction. The fuel vaporing device comprises a fuel vaporizer, a fuel injector which supplies fuel into the fuel vaporizer, an air injector which supplies air into the fuel vaporizer to produce an air-fuel mixture in the fuel vaporizer, and a glow plug which partially oxidizes the air-fuel mixture produced inside the fuel vaporizer. An air-supply amount of the air injector is controlled in relation to a fuel supply amount of the fuel injector so as to obtain an excess air factor of the fuel mixture corresponding to a predetermined rich air-fuel ratio.

The details as well as other features and advantages of this invention are set forth in the remainder of the specification and are shown in the accompanying drawings.

DESCRIPTION OF THE PREFERRED EMBODIMENTS

Figure 1:
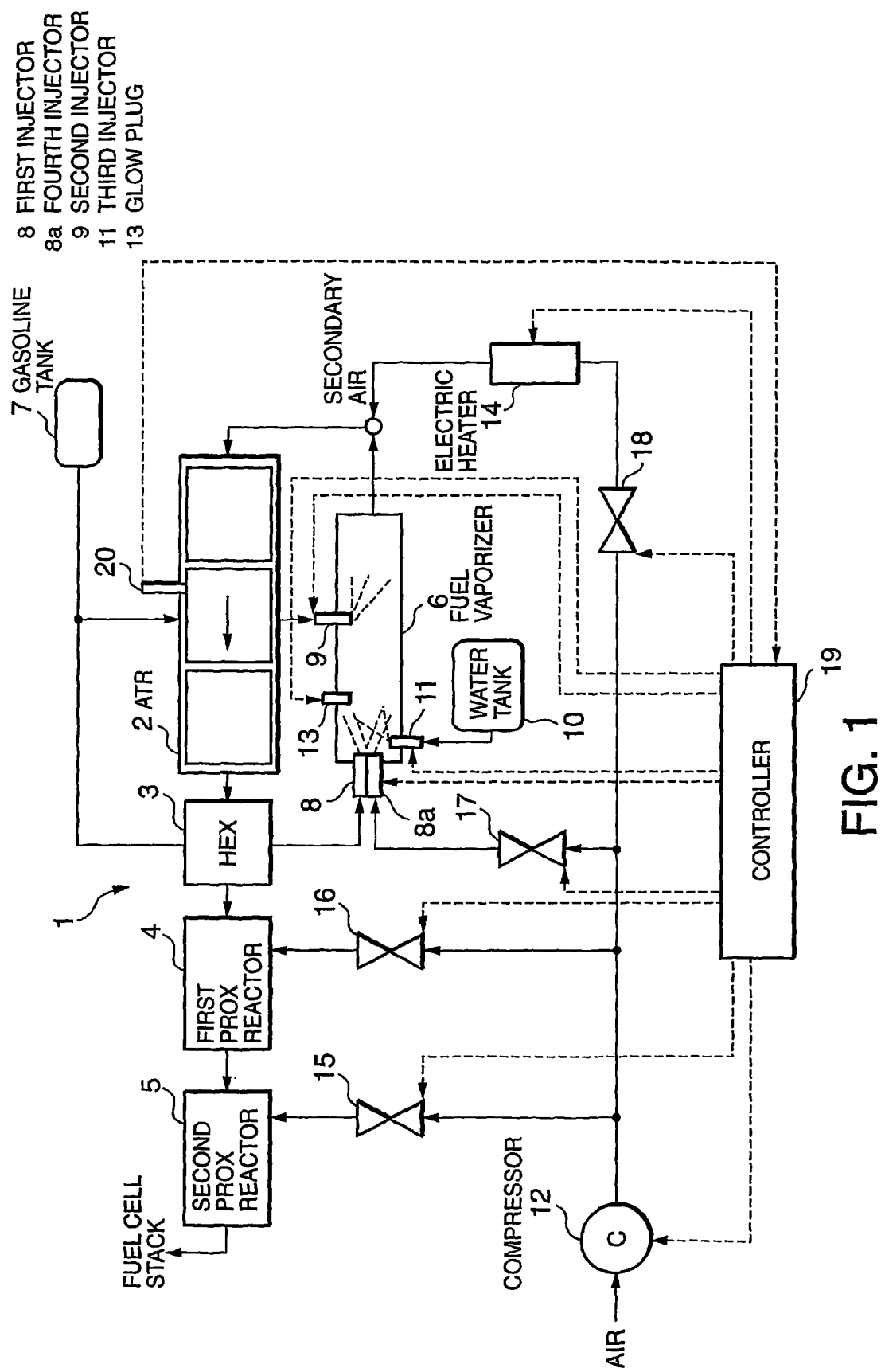
FIG. 1 is a schematic diagram of a fuel reforming device according to this invention.

Referring to FIG. 1 of the drawings, a fuel reforming device 1 for use in a fuel cell system comprises an autothermal reformer (ATR) 2 filled with a steam reforming catalyst, a heat exchanger (HEX) 3 which heats fuel by means of heat exchange between fuel and reformate gas, a first carbon monoxide preferential oxidation reactor (PROX reactor) 4 which removes carbon monoxide from the reformate gas, a second carbon monoxide preferential oxidation reactor (PROX reactor) 5, and a cylindrical fuel vaporizer 6 which supplies fuel vapor to the reformer 2.

The fuel reforming device 1 further comprises a gasoline tank 7 which stores the gasoline as fuel, a first injector 8 disposed in an upstream portion of the fuel vaporizer 6, and a second injector 9 disposed in a downstream portion of the fuel vaporizer 6. The fuel reforming device 1 injects gasoline into the fuel vaporizer 6 through the first injector 8 and second injector 9. The fuel reforming device 1 further comprises a water tank 10 which stores water that is required in a steam reforming reaction. The water stored in the water tank 10 is sprayed into the fuel vaporizer 6 through a third injector 11 disposed in the upstream portion of the fuel vaporizer 6.

Figure 2:
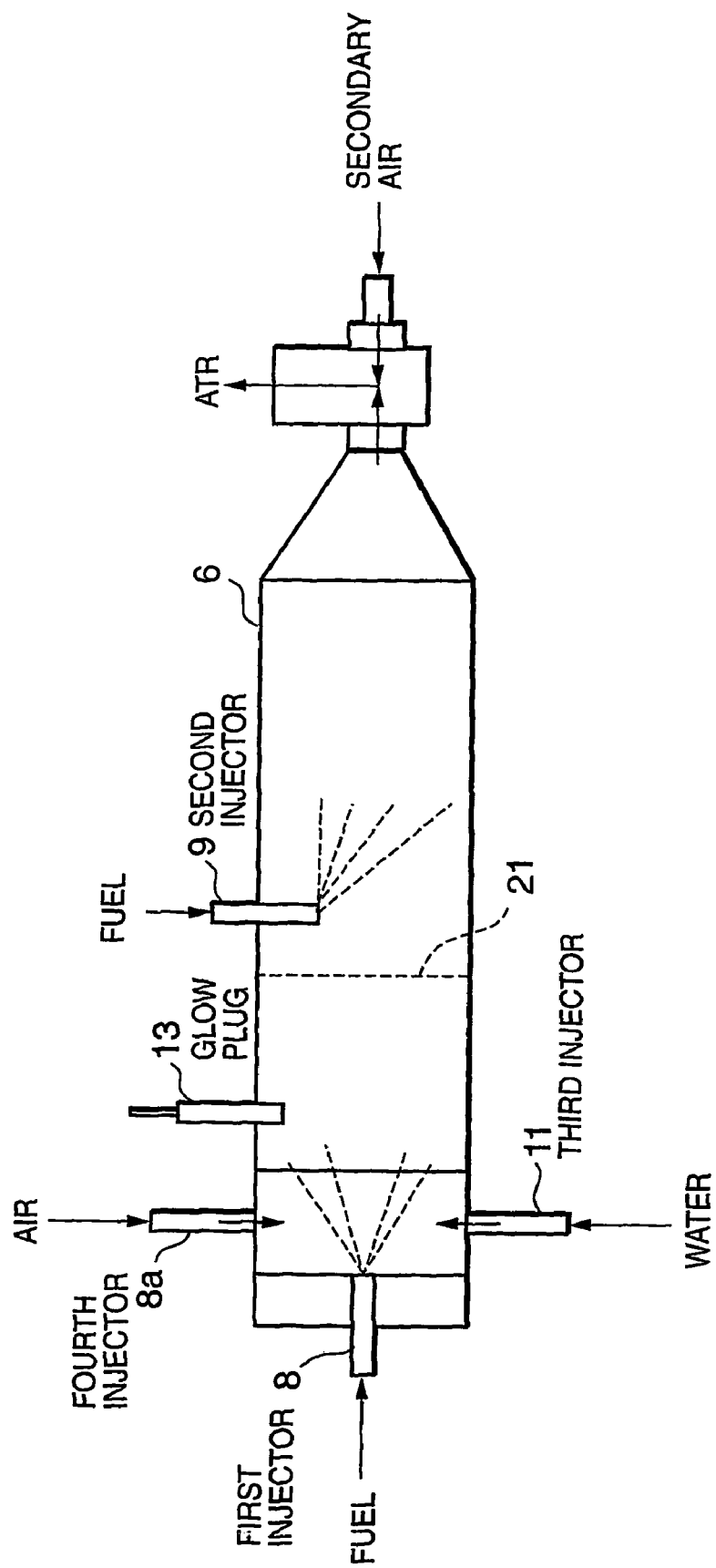
FIG. 2 is a schematic diagram of a fuel vaporizer according to this invention.

Referring to FIG. 2, a flame arrester 21 formed from metallic fiber or the like is disposed upstream of the second injector 9. The flame arrester 21 suppresses flame propagation through the fuel vaporizer 6 accompanying uneven partial oxidation of fuel vapor, and suppresses the generation of NOx caused by heat spots.

The fuel reforming device 1 further comprises a compressor 12 for supplying air. Primary air pressurized by the compressor 12 is injected into the fuel vaporizer 6 from a fourth injector 8a. The air injection direction of the fourth injector 8a is set such that the injected air forms a swirl around the inner periphery of the cylindrical fuel vaporizer 6. A glow plug 13 for partially oxidizing a part of an air-fuel mixture formed by the fuel injected from the first injector 8 and the air injected from the fourth injector 8a is provided inside the fuel vaporizer 6. The part of the fuel which contacts the glow plug 13 produces an oxidizing reaction and thereby generates heat. The remaining fuel which does not react with oxygen is transformed into fuel vapor by this heat and supplied to the reformer 2.

Secondary air may be supplied from the compressor 12 to the fuel vapor which is discharged from the fuel vaporizer 6. In this case, the secondary air is heated by an electric heater 14 and then mixed with the fuel vapor. The air that is delivered from the compressor 12 is also supplied to the first PROX reactor 4 and second PROX reactor 5.

The supply of air from the compressor 12 to the first PROX reactor 4 is performed via a control valve 15. The supply of air from the compressor 12 to the second PROX reactor 5 is performed via a control valve 16. The supply of air from the compressor 12 to the fuel vaporizer 6 is performed via a control valve 17. The supply of secondary air from the compressor 12 to the fuel vapor is performed via a control valve 18.

The fuel injection amount of the first injector 8, the fuel injection amount of the second injector 9, the water injection amount of the third injector 11, the air injection amount of the fourth injector 8a, operation of the compressor 12, ignition of the glow plug 13, operation of the heater 14, and operation of the control valves 15–18 are controlled by output signals from a controller 19.

The controller 19 is constituted by a microcomputer comprising a central processing unit (CPU), read-only memory (ROM), random access memory (RAM), and an input/output interface (I/O interface). The controller 19 may be constituted by a plurality of microcomputers.

The fuel reforming device 1 further comprises a temperature sensor 20 for detecting a catalyst temperature Tc of the reformer 2. The detected temperature Tc of the temperature sensor 20 is inputted into the controller 19 as a signal.

During a normal operation, the fuel reforming device 1 injects fuel into the fuel vaporizer 6 from the first injector 8 and second injector 9, and injects air into the fuel vaporizer 6 from the fourth injector 8a, and thus produces inside the fuel vaporizer 6 an air-fuel mixture with an excess air factor $\lambda$ smaller than 1.0, preferably between 0.2 and 0.4. In this embodiment, the excess air factor $\lambda$ of the air-fuel mixture produced inside the fuel vaporizer 6 is set at 0.3. The ratio between the fuel injection amounts of the first injector 8 and second injector 9 is fixed.

As described above, the air injected by the fourth injector 8a forms a swirl around the inner periphery of the cylindrical fuel vaporizer 6. This swirl promotes the mixing of the injected fuel from the fuel injectors 8, 9 and the air. Further, the third injector 11 sprays water toward the swirl, and thus the air-fuel mixture and the water mix efficiently. The swirl also acts to prevent the formation of fuel deposits around the injectors 8 and 9 and the formation of soot in the partial oxidation reaction region when an air-fuel mixture with a rich air-fuel ratio is burned.

When the air-fuel mixture produced in this manner contacts the glow plug 13, a partial oxidation reaction is produced, whereby heat is generated. The fuel component of the remaining air-fuel mixture which does not produce a partial oxidation reaction is vaporized by the generated heat and supplied to the reformer 2 as fuel vapor containing air and moisture. During a normal operation, secondary air is not supplied to the fuel vapor.

Reformate gas containing a large amount of hydrogen is produced in the reformer 2 from the fuel vapor. The PROX reactors 4 and 5 remove carbon monoxide from the reformate gas. A fuel cell system uses the hydrogen-rich gas produced in this manner to generate power from a fuel cell stack.

The hydrocarbon constituting the gasoline that is used as fuel in the fuel reforming device 1 is completely vaporized at approximately 280 degrees centigrade or more. This is lower than the stoichiometric reaction temperature of partial oxidation. Hence in order to vaporize the fuel component in the remaining air-fuel mixture in the fuel vaporizer 6 using the heat generated by partial oxidation as described above, the amount of oxygen supplied by the third injector 11 in relation to the fuel that is supplied to the fuel vaporizer 6 must be made lower than the amount of oxygen required for the reaction in the equation (1). By setting the excess air factor $\lambda$ of the air-fuel mixture inside the fuel vaporizer 6 to within a range of 0.2 to 0.4 as described above, the amount of reaction heat required to vaporize the fuel can be ensured, an excessive partial oxidation reaction can be suppressed, and a sufficient amount of fuel vapor can be supplied to the steam reforming catalyst of the reformer 2. In the fuel reforming device 1, as described above, the excess air factor $\lambda$ of the air-fuel mixture inside the fuel vaporizer 6 is set at 0.3. This setting is realized by controlling the amount of air injected by the fourth injector 8a, or in other words by adjusting the opening of the control valve 17.

Next, a start-up operation of the fuel reforming device 1 will be described.

In this case also, similarly to a normal operation, fuel is vaporized using the heat generated by the partial oxidation reaction in the vaporizer 6. However, at a point during the supply of fuel vapor to the reformer 2, secondary air supplied from the compressor 12 and heated by the heater 14 is mixed with the fuel vapor. As a result, fuel vapor with a large excess air factor is supplied to the reformer 2. The secondary air is also supplied such that the flow of fuel vapor forms a swirl, and hence mixing of the fuel vapor and air can be precipitated. The secondary air supply amount is set such that the excess air factor λ of the air-fuel mixture supplied to the reformer 2 is within a range of 3 to 6 at the inlet to the reformer 2.

If the excess air factor λ is less than 3, the temperature of the reforming space may rise due to the lack of excess air, as a result of which nitrogen oxides (NOx) may be generated. If the excess air factor λ is greater than 6, it becomes difficult to maintain the required combustion gas temperature for warming the reformer 2, first PROX reactor 4, and second PROX reactor 5. Hence the excess air factor λ at the inlet to the reformer 2 is preferably set to within a range of 3 to 6.

During a start-up operation of the fuel reforming device 1, the controller 19 monitors the catalyst temperature of the reformer 2 which is detected by the temperature sensor 20. When the catalyst temperature reaches a warm-up completion temperature, the secondary air supply amount is gradually reduced such that the catalyst temperature reaches a higher reforming temperature, or in other words the catalyst temperature during a normal operation, smoothly. By means of this control, the reformer 2 is prevented from being subject to thermal shock.

The secondary air supplied by the compressor 12 is heated by the heater 14. Thus the air-fuel mixture having a large excess air factor that is supplied to the reformer 2 during start-up is reliably burned in the reformer 2. The carbon monoxide (CO) and hydrogen ($H_2$) that are produced by partial oxidation reforming inside the fuel vaporizer 6 are also burned together in the reformer 2. The catalyst inside the reformer 2 therefore has little opportunity to contact the carbon monoxide (CO) and is activated rapidly by the heat produced by the combustion of the carbon monoxide (CO) and hydrogen ($H_2$). Furthermore, no unburned fuel is discharged from the reformer 2.

The object of the start-up operation of the fuel reforming device 1 is to rapidly warm up the reformer 2 rather than to extract hydrogen ($H_2$). This is the reason why the hydrogen ($H_2$) generated by the partial oxidation reforming in the fuel vaporizer 6 is burned. This combustion is halted at the same time as the supply of secondary air is halted during the transition from the start-up operation to a normal operation.

If heating of the secondary air by the heater 14 is begun prior to the partial oxidation reaction inside the fuel vaporizer 6 such that the reformer 2 is preheated by the heated secondary air, the catalyst inside the reformer 2 can be sufficiently activated prior to the inflow of fuel vapor. By taking this measure, fuel vapor flowing into the reformer 2 during the start-up operation can be prevented from becoming adhered to the reforming catalyst, whereby phenomena such as poisoning of the reforming catalyst and discharge of unburned fuel vapor can be prevented even more comprehensively. Further, since the preheated catalyst is sufficiently activated, a favorable reforming reaction is produced in the reformer 2 immediately after the beginning of the supply of fuel vapor.

Figure 3:
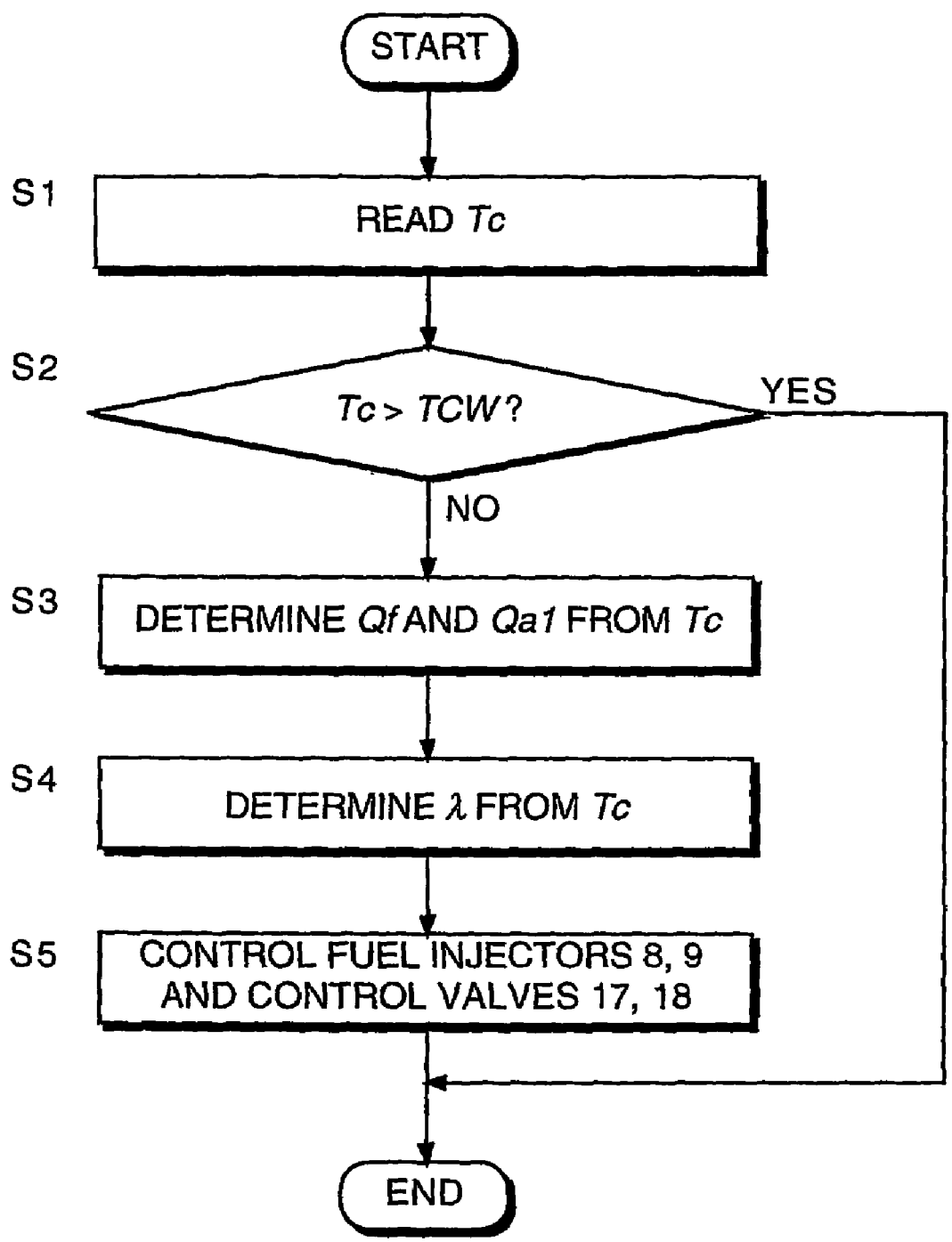
FIG. 3 is a flowchart illustrating a fuel vaporization control routine executed by a controller according to this invention during start-up of the fuel reforming device.

Next, referring to FIG. 3, a start-up control routine executed by the controller 19 during start-up of the fuel reforming device will be described. This routine is executed at intervals of ten milliseconds from start-up of the engine through the transition to a normal operation.

First, in a step S1, the controller 19 reads the catalyst temperature Tc of the reformer 2 detected by the temperature sensor 20.

Next, in a step S2, the controller 19 compares the catalyst temperature Tc with a warm-up completion temperature TCW of the reformer 2. If the catalyst temperature Tc is higher than the warm-up completion temperature TCW, the controller 19 determines that the warm-up operation of the fuel reforming device 1 is complete, and after performing transition processing to normal operation control in a step S6, ends the routine. Following the processing of the step S6, the routine is not executed until the fuel reforming device 1 is restarted.

Figure 4:
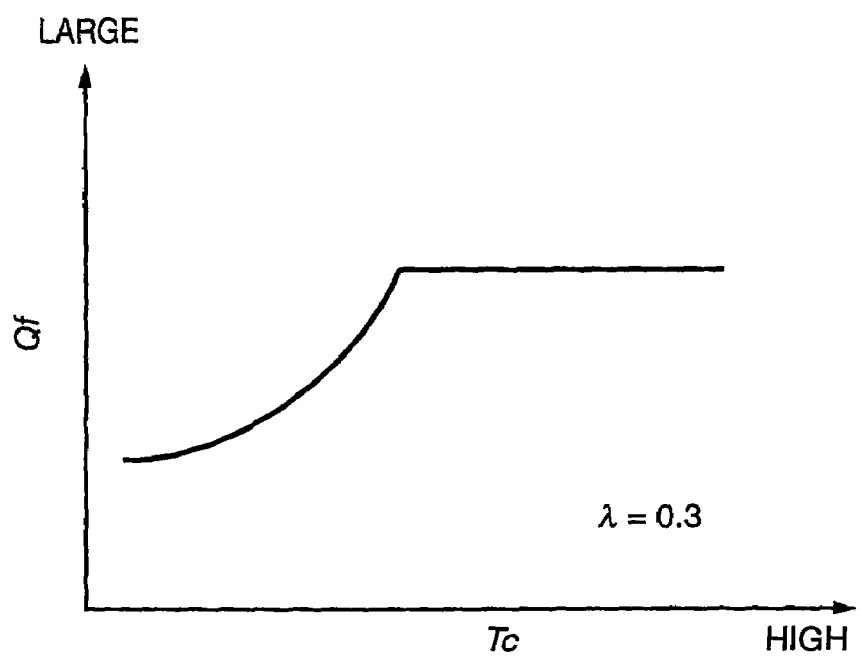
FIG. 4 is a diagram illustrating the characteristic of a map stored by the controller defining the relationship between a temperature of a reforming catalyst and a fuel injection amount.

If, in the step S2, the catalyst temperature Tc does not exceed the warm-up completion temperature TCW, in a step S3 the controller 19 determines a fuel injection amount Qf from the catalyst temperature Tc by referring to a map which is stored in advance in the memory (ROM) and which has the characteristic shown in FIG. 4. Here, the fuel injection amount Qf corresponds to the total fuel injection amount of the first injector 8 and second injector 9.

Referring to FIG. 4, in this map the fuel injection amount Qf increases as the catalyst temperature Tc rises, and becomes a fixed value when the catalyst temperature Tc reaches a fixed temperature.

The fuel injection amount ratio between the first injector 8 and second injector 9 is a preset, fixed value in accordance with the specifications of the fuel vaporizer 6.

The controller 19 also calculates a primary air supply amount Qa1 from the fourth injector 8*a* to the reformer 2 with the excess air factor λ set at 0.3 in relation to the fuel injection amount Qf. As noted above, excess air factor λ=0.3 is identical to the excess air ratio λ during a normal operation.

Figure 5:
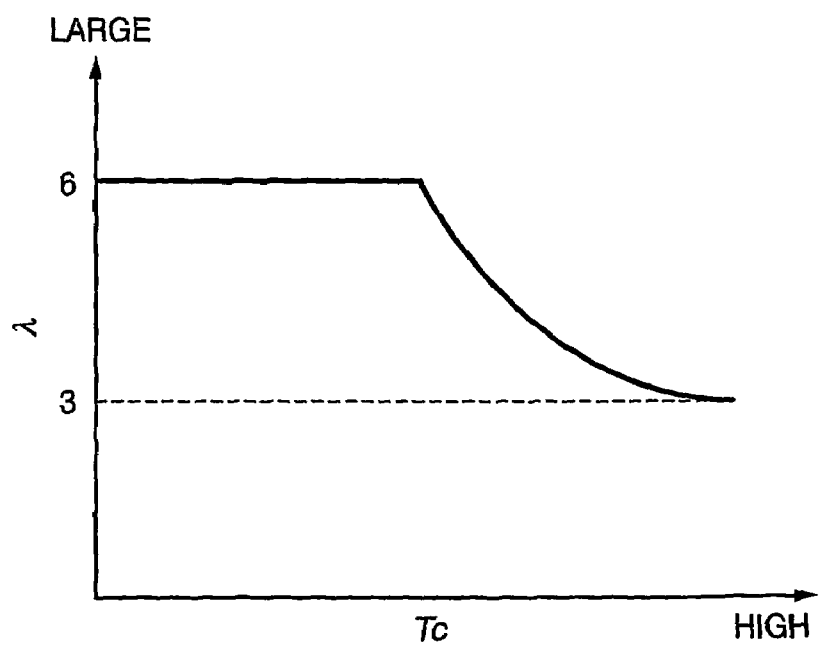
FIG. 5 is a diagram illustrating the characteristic of a map stored by the controller defining the relationship between a temperature of the reforming catalyst and an excess air factor of fuel vapor after a supply of secondary air.

Next, in a step S4, the controller 19 determines from the catalyst temperature Tc the excess air factor λ of the fuel vapor that is supplied to the reformer 2 by referring to a map which is stored in advance in the memory (ROM) and which has the characteristic shown in FIG. 5.

Referring to FIG. 5, in this map, when the catalyst temperature Tc is low, the excess air factor λ is 6, and after the catalyst temperature Tc has reached a fixed temperature, the excess air ratio λ falls to 3 as the catalyst temperature Tc rises. The controller 19 calculates a secondary air supply amount Qa2 based on the determined excess air factor λ.

Next, in a step S5, the controller 19 controls the fuel injection amounts of the first injector 8 and second injector 9 and the opening of the control valves 17 and 18 in order to realize the fuel injection amount Qf, the primary air supply amount Qa1, and the secondary air supply amount Qa2. The controller 19 also controls the third injector 11 in accordance therewith such that moisture is supplied to the fuel vapor inside the fuel vaporizer 6. It should be noted that as an execution condition of this routine, the glow plug 13 and heater 14 are maintained in an ON condition at all times.

By executing this routine, an air-fuel mixture of gasoline fuel with an excess air factor λ within a range of three to six is produced in the fuel vaporizer 6 during a start-up operation of the fuel reforming device 1, and a part of this air-fuel mixture is partially oxidized by the glow plug 13 so as to generate heat. This heat promotes vaporization of the remaining fuel. Meanwhile, a high-temperature, lean air-fuel mixture containing water vapor, which is produced by mixing the fuel vapor air-fuel mixture and secondary air heated by the heater 14, is supplied to the reformer 2. This high-temperature, lean air-fuel mixture causes the temperature of the catalyst inside the reformer 2 to rise rapidly to a warm-up completion temperature.

The contents of Tokugan 2003-003594, with a fling date of Jan. 9, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

INDUSTRIAL FIELD OF APPLICATION

As described above, this invention is capable of improving the reforming efficiency of reformate gas by controlling the excess air factor of vaporized fuel produced by a fuel vaporizer so as to increase the proportion of steam reforming to partial oxidation reforming in a reformer. Rapid activation of a reforming catalyst during start-up is also enabled, and discharge of unburned fuel from the reformer is suppressed. Hence the fuel vaporizing device according to this invention has a particularly favorable effect when applied to a fuel cell system for a vehicle.

The embodiments of this invention in which an exclusive property or privilege is claimed are defined as follows:

The invention claimed is:

1. A fuel vaporizing device which supplies fuel vapor containing hydrocarbon to a fuel reformer which produces reformate gas having hydrogen as a main component from the fuel vapor by a catalytic reaction, comprising:
   a fuel vaporizer;
   a fuel injector which supplies fuel into the fuel vaporizer during normal running and start-up of the fuel reformer;
   an air injector which supplies air into the fuel vaporizer to produce an air-fuel mixture in the fuel vaporizer during the normal running and the start-up of the fuel reformer, an air supply amount of the air injector being controlled in relation to a fuel supply amount of the fuel injector so as to obtain an excess air factor of the air-fuel mixture corresponding to a predetermined rich air-fuel ratio;
   a glow plug which is disposed downstream of the fuel injector and the air injector in the fuel vaporizer and partially oxidizes the air-fuel mixture produced inside the fuel vaporizer; and
   a water injector which supplies moisture to the air-fuel mixture in the fuel vaporizer.

2. The fuel vaporizing device as defined in claim 1, wherein the excess air factor corresponding to the predetermined rich air-fuel ratio is within a range of 0.2 to 0.4.

3. The fuel vaporizing device as defined in claim 1, wherein the fuel vaporizing device further comprises a member which suppresses flame propagation accompanying the partial oxidation of the fuel inside the fuel vaporizer.

4. The fuel vaporizing device as defined in claim 1, wherein the fuel vaporizing device further comprises a valve which supplies secondary air to the fuel vapor produced by the fuel vaporizer.

5. The fuel vaporizing device as defined in claim 4, wherein the fuel vaporizing device further comprises a heater which heats the secondary air.

6. The fuel vaporizing device as defined in claim 4, wherein the fuel vaporizing device further comprises a controller programmed to control the valve to stop supplying the secondary air when a start-up period of the reformer is complete.

7. The fuel vaporizing device as defined in claim 6, wherein the fuel vaporizing device further comprises a sensor which detects a temperature of a catalyst of the fuel reformer, and the controller is further programmed to determine that the start-up period of the fuel reformer is complete when the temperature of the catalyst exceeds a predetermined warm-up completion temperature.

8. The fuel vaporizing device as defined in claim 7, wherein the controller is further programmed to control a secondary air flow rate of the valve such that the excess air factor of the fuel vapor that is supplied to the fuel reformer during the start-up period of the fuel reformer decreases as the temperature of the catalyst rises, an air amount supplied to the fuel reformer is larger than a stoichiometric amount required for the combustion of the fuel vapor during the start-up of the fuel reformer, and the air amount supplied to the fuel reformer is smaller than the stoichiometric amount during the normal running of the fuel reformer.

9. The fuel vaporizing device as defined in claim 8, wherein the excess air factor of the fuel vapor that is supplied to the fuel reformer during the start-up period of the fuel reformer is set to a value within a range of 3 to 6.

10. The fuel vaporizing device as defined in claim 7, wherein the controller is further programmed to control the fuel injector such that a fuel injection amount of the fuel injector increases as the temperature of the catalyst rises.

11. The fuel vaporizing device as defined in claim 1, wherein the fuel vaporizing device is adapted to vaporize air-fuel mixture that is not oxidized by the glow plug with heat produced by the partial oxidation of the air-fuel mixture.

* * * * *